US008627424B1

(12) United States Patent
O'Malley et al.

(10) Patent No.: US 8,627,424 B1
(45) Date of Patent: Jan. 7, 2014

(54) DEVICE BOUND OTP GENERATION

(75) Inventors: Michael J. O'Malley, Lowell, MA (US);
Robert S. Philpott, Andover, MA (US)

(73) Assignee: EMC Corporation, Hopkinton, MA (US)

( * ) Notice: Subject to any disclaimer, the term of this patent is extended or adjusted under 35 U.S.C. 154(b) by 288 days.

(21) Appl. No.: 12/827,045

(22) Filed: Jun. 30, 2010

(51) Int. Cl.
*G06F 15/16* (2006.01)
*H04L 29/06* (2006.01)
*H04L 12/28* (2006.01)

(52) U.S. Cl.
USPC .................... 726/6; 726/9; 713/158; 370/254

(58) Field of Classification Search
USPC .......... 713/168–174, 182–186, 202; 709/225, 709/229; 726/2–8
See application file for complete search history.

(56) References Cited

U.S. PATENT DOCUMENTS

2010/0199104 A1* 8/2010 Van Rijnswou ............... 713/189
2010/0325429 A1* 12/2010 Saha et al. .................... 713/158

FOREIGN PATENT DOCUMENTS

WO    WO 2006044717 A2 *  4/2006

* cited by examiner

*Primary Examiner* — Evans Desrosiers
(74) *Attorney, Agent, or Firm* — Krishnendu Gupta; Joseph D'Angelo

(57) ABSTRACT

A method, system, and computer product for use in generating one time passcodes (OTPs) in security environment, the security environment comprising an OTP generator and an OTP validator, the method comprising generating, at the OTP generator, an OTP according to a function, wherein the function includes as an input a device id, validating the OTP at the OTP validator, whereby the validation comprises generating, at the OTP validator, a second OTP according to the function, and determining whether the OTP is valid based on a comparison of the OTP with the second OTP generated at the OTP validator.

16 Claims, 7 Drawing Sheets

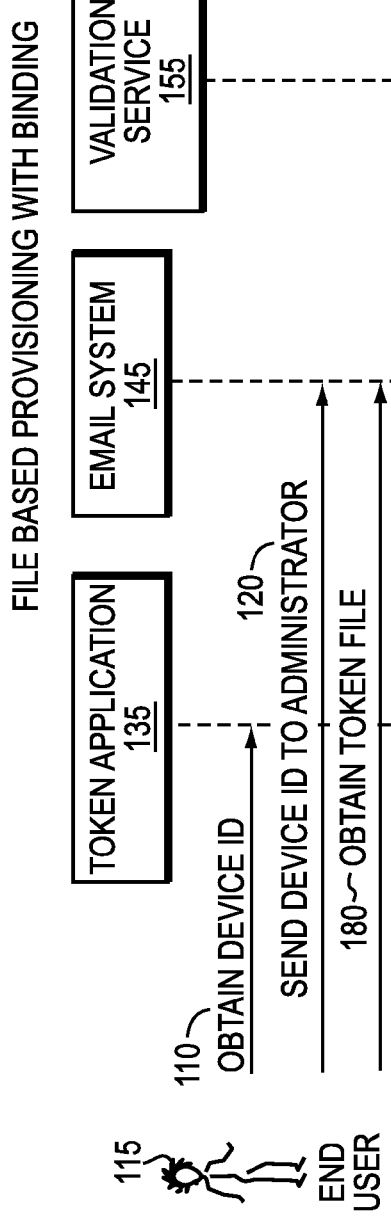
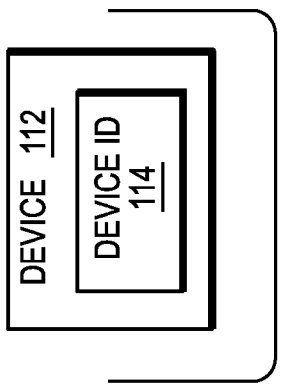
FIG. 1A
FIG. 1B

DEVICE BOUND OTP GENERATION

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Computer networks, and in particular Wide Area Networks (WANs) such as the Internet, provide opportunities for the misuse and abuse of communications traveling thereover. For example, two users (e.g., a human user and an enterprise server) communicating via the WAN may have their communications intercepted and/or altered. Also, it is possible for one user to misrepresent his, her, or its identity to another user.

Thus, there is a need for both privacy and authentication between users of the network communicating with one another. In other words, users should be able to rely on the fact that their transmissions will not be intercepted or altered, and that transmissions from someone purporting to be a particular user do in fact originate from that user.

In many secure communication applications, a key is required in order to perform certain cryptographic operations such as encryption, decryption, authentication, etc. The key may comprise, by way of example, a symmetric key or other secret shared by two or more entities.

One such application is in authentication tokens, such as the RSA SecurID® authentication token commercially available from RSA Security Inc. of Bedford, Mass., U.S.A. The RSA SecurID® authentication token is used to provide two-factor authentication. Authorized users are issued individually-registered tokens that generate single-use one time passcodes (OTPs), which change based on a time code algorithm. For example, a different OTP may be generated every 60 seconds. In a given two-factor authentication session, the user is required to enter a personal identification number (PIN) plus the current OTP from his or her authentication token. This information is supplied to an authentication entity. The authentication entity may be a server or other processing device equipped with RSA ACE/Server® software, available from RSA Security Inc. The PIN and current OTP may be transmitted to the authentication entity via an encryption agent equipped with RSA ACE/Agent® software, also available from RSA Security Inc. If the PIN and current OTP are determined to be valid, the user is granted access appropriate to his or her authorization level. Thus, the OTPs are like temporary passwords that cannot be guessed by an attacker, with other than a negligible probability.

A given RSA SecurID® token typically contains one or more keys that are utilized in computing OTPs. The authentication entity performing the verification of the OTPs requires access to one or more keys associated with the token in question. Typically, such authentication entities have access to the same key or set of keys that the token uses to generate its output.

SUMMARY OF THE INVENTION

A method, system, and computer product for use in generating one time passcodes (OTPs) in a security environment, the security environment comprising an OTP generator and an OTP validator, the method comprising generating, at the OTP generator, an OTP according to a function, wherein the function includes as an input a device id, validating the OTP at the OTP validator, whereby the validation comprises generating, at the OTP validator, a second OTP according to the function, and determining whether the OTP is valid based on a comparison of the OTP with the second OTP generated at the OTP validator.

BRIEF DESCRIPTION OF THE DRAWINGS

FIG. 1 is an embodiment of the current techniques illustrating file based provisioning with device binding;

DETAILED DESCRIPTION

Figure 2:
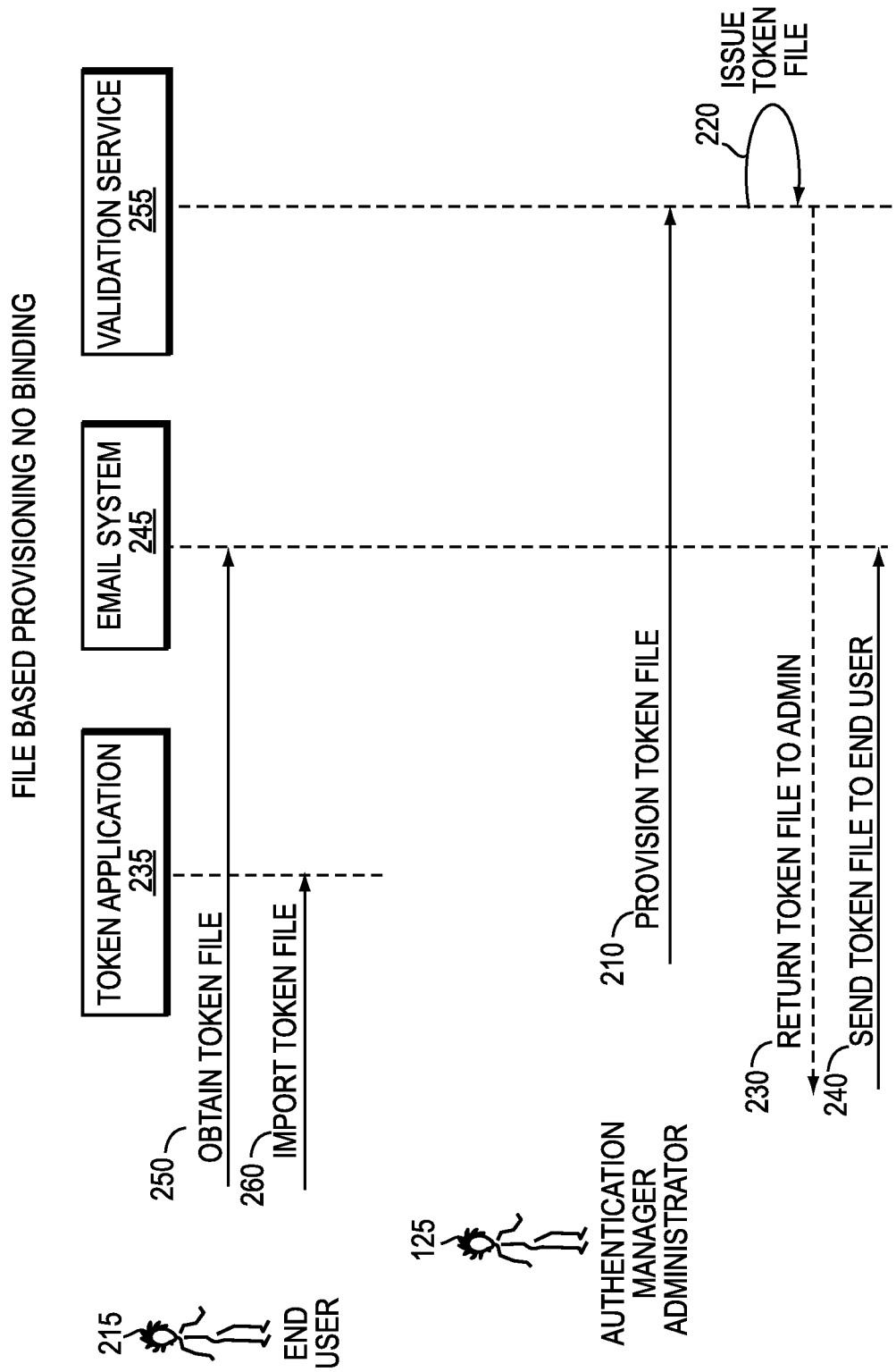
FIG. 2 is an embodiment of the current techniques illustrating file based provisioning.

An authentication token may be used to provide two-factor authentication where a user may be issued an individually-registered token, which generates single-use one time passcodes (OTPs), which change based on the algorithm implementation. For example, a different OTP may be generated every 60 seconds for an implementation that is based on time. The generation of the OTP may be driven by an internal clock of the token generator.

The OTP, in isolation or in combination with a user pin, may be supplied to an authentication entity. Herein, an OTP in isolation or in combination with a personal identification code (PIN) may be referred to as a OTP. The authentication entity may be a server or other processing device which may determine if the supplied information is valid, and may grant access appropriate to his or her authorization level. The authentication entity may as an example also have an internal clock to index the supplied token by a given time T for an algorithm implementation that is based on time.

An OTP generator may be a software program resident on a hardware device, a hardware device, or a combination of software and hardware. Conventionally, an OTP generator includes a set of inputs, such as a key, an identifier for the particular key, and a value that changes monotonically (e.g., time, or a counter value). Both the OTP generator and the authentication entity must have access to this information to enable the validation of OTP values. Typically, OTP generators are provisioned or passed a key. Conventionally, the key in token products is often stored in a file on the host operating system or in memory on a hardware device.

Typically, the key may be stored or available on the hardware and may be protected via some form of encryption. Conventionally, if the key is decrypted or obtained, it may be passed to the OTP generator to generate valid OTPs. Currently, this may make it easier to use a stolen key as the OTP generation may have no binding to the device for which it was intended. Typically, this may enable replication of the OTP if someone were able to gain access to the serial number, key, and OTP algorithm.

In an aspect of the current techniques, the function used to generate the OTP may be altered to include additional inputs. In an embodiment of the current techniques, an OTP generation algorithm used to generate the OTP may include any number of inputs. In a further embodiment of the current techniques, the number and type of inputs for the OTP generation function may include information particular to the device on which the OTP generator is located. In general, most devices have a unique hardware identifier. In a further aspect of the current techniques, a key may be generated from a cryptographic operation over a user password, which may bind a password to a specific device. Herein, the term device ID may be used to refer to an unique identifier. The unique identifier may include, for example, a hardware ID, a communication session ID, an ID of a virtual device, and an ID of a virtual session.

In a particular embodiment of the current techniques, an OTP generator algorithm may use as an input a particular hardware code located on the hardware device on which the OTP generator algorithm resides. In at least some embodiments, the particular hardware code is a unique hardware code. In a further embodiment, this may enable an OTP generator to be tied to a particular piece of hardware such as a cell phone or a computer.

In a further embodiment of the current techniques, an OTP generator algorithm may use as an input a particular identifier provided by a virtual environment software running on a device on which the OTP generator algorithm resides. This identifier may represent a hardware identifier as passed between the device and the virtual environment, an identifier for the virtual environment, limiting the use of the key beyond the boundary of the virtual machine, or an identifier representing the availability of some other network system that must be present to provide an identifier for the algorithm.

In a further embodiment of the current techniques, if the input characteristics and OTP algorithm were replicated on another hardware device, the OTP algorithm may not function correctly as it may lack the hardware identifier. In an embodiment of the current techniques, a hardware specific identifier may be used as an input to the OTP generation algorithm. In other embodiments, the OTPs generated may also have a binding to the specific hardware on which the OTP generation code is running.

In at least one embodiment of the current techniques, the authentication entity may be made aware of the hardware device ID. In certain embodiments, the authentication entity may be made aware of the hardware specific device ID during the key provisioning process. In other embodiments, the authentication entity may be made aware of the hardware specific device ID in another manner, such as during out of band communication. In further embodiments, a system administrator may record the hardware specific device ID before giving the device to a user, where the system administrator may provide the authenticator with the device ID.

In alternative embodiments of the current techniques, the user may contact the administrator and provide the device specific ID, where the system administrator provides the ID to the OTP validator. In some embodiments, the user may contact the administrator by phone. In other embodiments, the user may contact the administrator by e-mail. In further embodiments, the device ID may be directly communicated to the authentication server during the key provisioning process. In at least one embodiment, the device ID may be communicated via the availability of a network system or by an available network system.

In a further embodiment of the current techniques, binding the OTP to a device may require a modification of the OTP generating algorithm to include a device ID in the calculation. In certain embodiments, as the device ID may be obtained directly by the algorithm and may not be passed to the device, this may make it harder for an attacker to gain access to the device ID. In further embodiments, an attacker may be able to intercept a key passed to a token device during provisioning, but may have to capture the device to get the device ID or know the device ID in advance, in addition to the key to generate OTPs. In at least some embodiments, for an attacker to re-create an OTP, the attacker would also need to re-implement the OTP algorithm to generate codes on the intended device.

In certain embodiments, by using a hardware specific characteristic, or a hash of a number of these characteristics, it may be able to create a device specific identifier. This may create an environment where only the device can generate the OTP.

In at least one embodiment, the device ID may be used as an input for the OTP generation algorithm. In further embodiments, when the key is provisioned the server can use the device ID as an input to the generation of the OTP. In certain embodiments, the client device may use CT-KIP to identify hardware characteristics of the device. CT-KIP may be a client-server protocol for the secure initialization (and configuration) of cryptographic tokens. Conventionally, CT-KIP may require neither private-key capabilities in the cryptographic tokens, nor an established public-key infrastructure. Typically, successful execution of the CT-KIP may result in the generation of the same shared secret on both the server as well as the token. In further embodiments, the key may be provisioned using a different type of network-based provisioning protocol.

In some embodiments of the current techniques, the addition of the hardware specific device ID may add a level of protection. In certain embodiments, the additional level of protection may be because the attacker may need to know the key as well as possess an implementation of the OTP generating algorithm, and the hardware specific ID to generate OTP values. In alternative embodiments, the OTP generating algorithm may include obtaining the device characteristics from the hardware. In further embodiments, this may require an attacker to re-implement the algorithm, gain the device ID, and gain the key in order to obtain the correct code. In even further embodiments, this may require the attacker to gain access to the device and query the device for the hardware specific characteristics.

In an alternate embodiment of the current techniques the device ID is combined with a session specific ID for the server. In one such embodiment, the server identifier may be created from a cryptographic hash of the server's SSL certificate. The OTP validator may use the SSL certificate, or something derived from the SSL certificate that uniquely identifies the certificate, as an additional input to the generation algorithm. The resulting code may be passed to the webserver during normal authentication. The webserver may provide the certificate to the authentication server in order to validate the code. The authentication server may use the provided SSL certificate to derive a similar session identifier and along with the other inputs to the algorithm verify the code supplied. The resulting authentication may verify that the user is in possession of a known device, and is communicating to a known server which possesses the keys necessary to complete a SSL network connection. In some embodiments, the verification case may include both the device ID and session ID, or any combination thereof.

Provisioning:

Consider the embodiments of FIG. 1*a* and FIG. 1*b* which represents token based file provisioning with device binding. In this embodiment, a user 115 may obtain a device ID 114 from Device 112 (step 110). The end user 115 may send the device ID 114 to an Administrator 125 (step 120). The administrator 125 may receive the Device ID 114 from the end user 115 (step 130). The administrator 125 may provision a token file (step 140). The Validation Service 155 may issue a token file (step 150). The Validation Service 155 may return the token to the administrator 125 (step 160). The administrator 125 may send the token file to the user 115 (step 170). The user 115 may obtain the file (step 180). The user 115 may import the file (step 190). The user may then have a provisioned token application.

Consider the embodiment of FIG. 2. The embodiment of FIG. 2 illustrates token based file provisioning without hardware binding. The administrator 225 may Provision Token File with Device ID (step 210). The Validation Service 255 may issue Token File Bound to Device ID (step 220). The token file may be returned to the administrator 225 (step 230). The administrator 225 may send the token file to the user (step 240). The user 215 may obtain the token file (step 250) and import the token file into the application (step 260). This embodiment has provision a token which is not bound to the particular hardware device.

Figure 3:
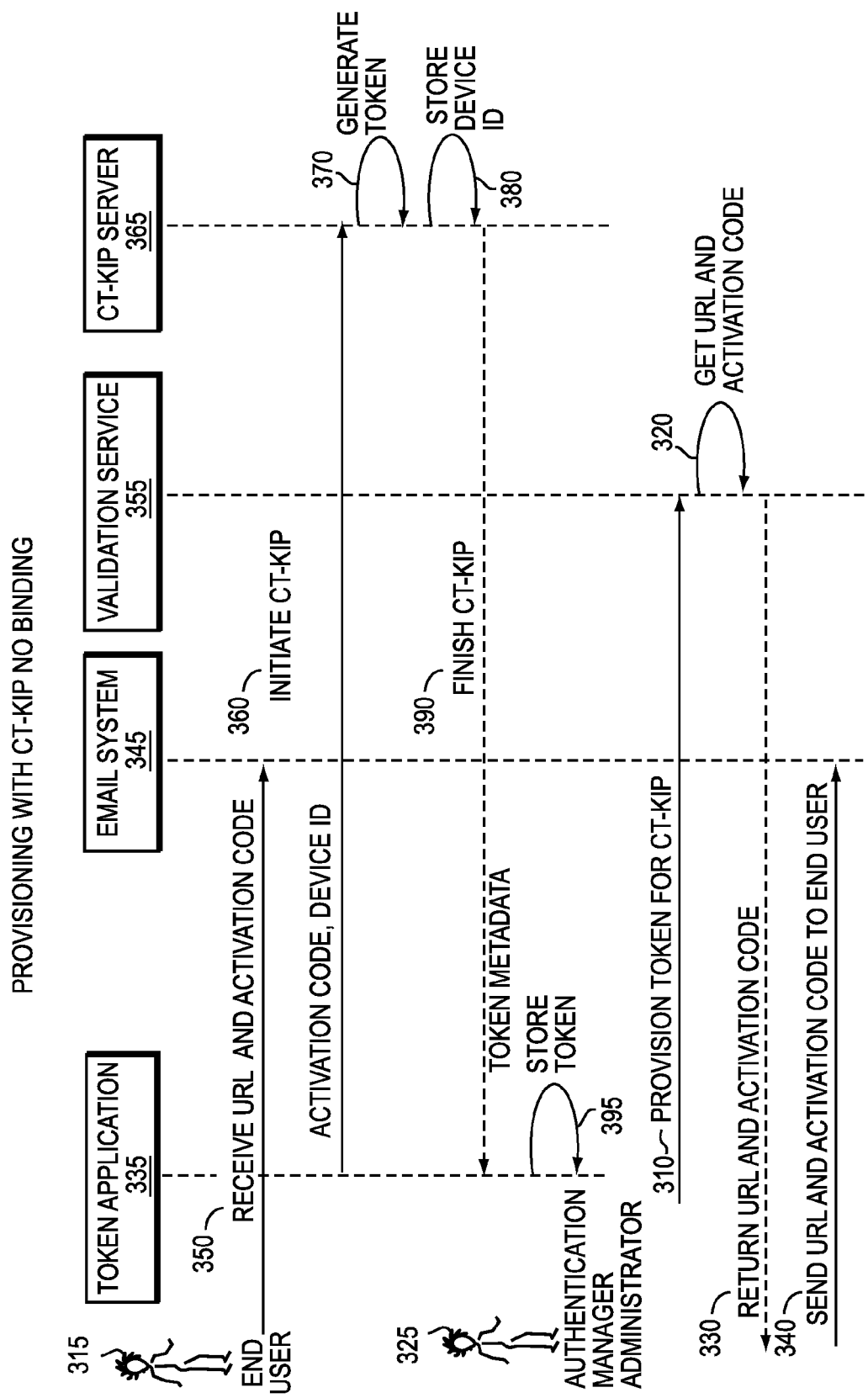
FIG. 3 is an embodiment of the current techniques illustrating CT-KIP based provisioning.

Consider now the embodiment of FIG. 3, which illustrates provisioning of a token via CT-KIP without hardware binding. An administrator 325 may prepare a token to be provisioned for CT-KIP. The Validation Service 365 may get a URL and identification code. The URL and identification code may be returned to the administrator 325. The administrator 325 may send the code to the user. The user 315 may receive the URL and activation code. The user 315 may initiate CT-KIP. The user 315 may send the activation code and device ID to the Validation Service. The Validation Service 365 may generate a token and store the device ID. The Validation Service 365 may send the token back to the user. The user 315 may store the token for use with the token generator.

The embodiment of FIG. 3 may be modified so that there is hardware binding. In certain embodiments, the user may send the device ID to the administrator via e-mail. In other embodiments, the user may call the administrator. In further embodiments, the administrator may have recorded the device ID before it is given to the user. When provisioning the token for CT-KIP, the administrator may also pass the device ID to the Validation Service. The Validation Service may create a token bound to the device ID. In this manner, when the user communicates with the Validation Service via CT-KIP, the user may receive a token which is bound to the particular device. In an alternative embodiment, the user may supply the Validation Service with the device ID during CT-KIP, which may allow the administrator to create a token bound to the device.

Figure 4:
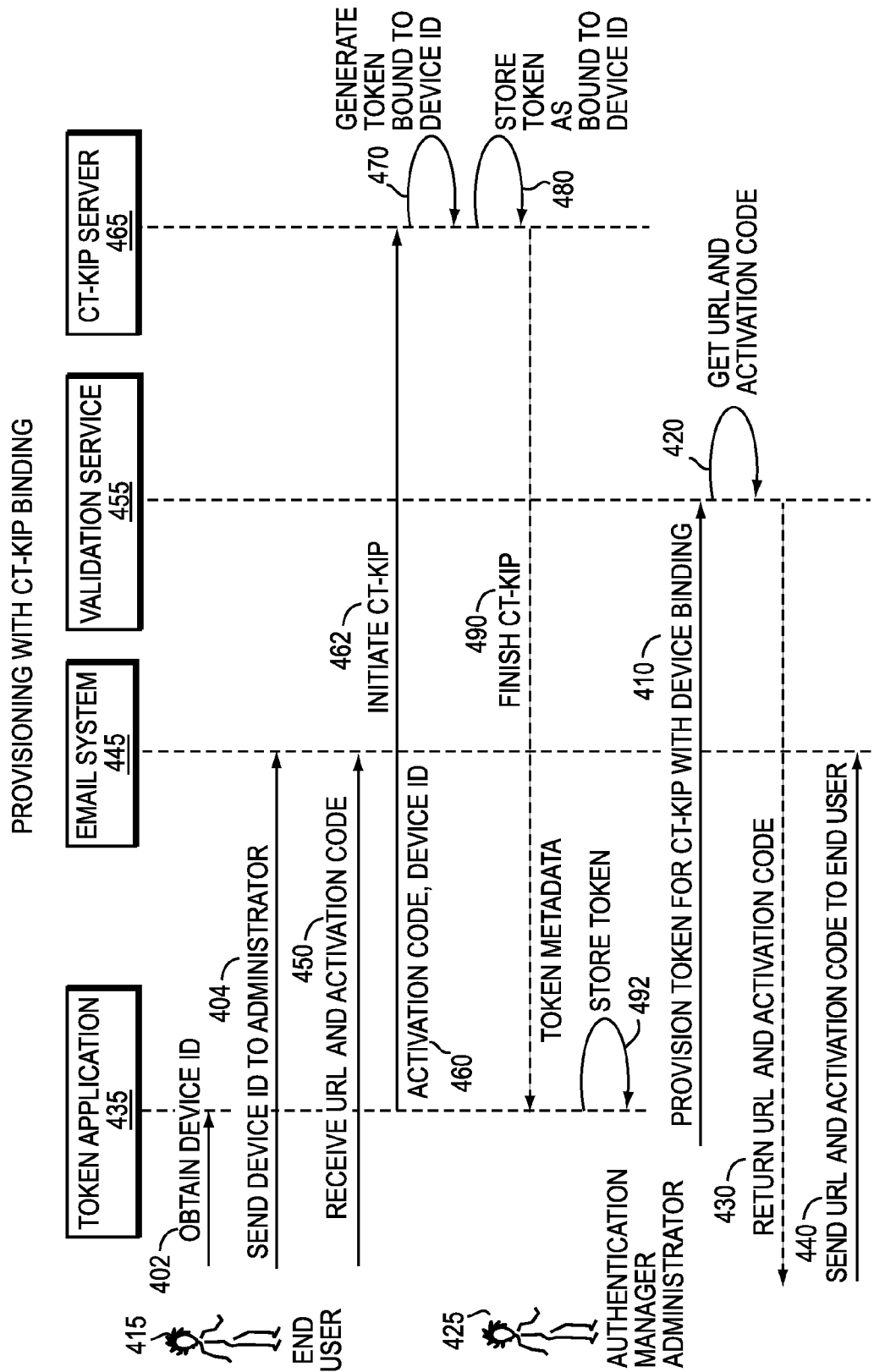
FIG. 4 is an embodiment of the current techniques illustrating CT-KIP based provisioning with device binding.

Refer now to the embodiment of FIG. 4 illustrating provisioning of a software token via CT-KIP with binding. In this embodiment a user 415 obtains a device id from a device (step 402). A token application 435 may facilitate obtaining the device ID. The user 415 may send the device ID to an administrator 435 (step 404). The user may send the device ID to the administrator in a number of ways including using an e-mail server 445. The Administrator 425 may receive the device ID. The administrator 425 may provision a token for CT-KIP with device binding by communicating with the Validation Service 455 (step 410). The Validation Service 455 may get a URL and activation code of the CT-KIP server 465 (step 420). The Validation Service 455 may return the URL and activation code to the administrator 425 (step 430). The administrator 425 may send the URL and activation code to the user 415 via an e-mail server 445 (step 440). In alternative embodiments, the administrator 455 may communicate the URL and Activation code to the user in another method i.e. phone or personal contact. The user 415 may receive the URL and activation code (step 450). The User 415 may initiate CT-KIP using the activation code and device ID. The CT-KIP Server 465 may generate a token bound to the device ID (step 470). The CT-KIP 465 server may store the token as bound to the device ID (step 480). CT-KIP may finish and the token metadata may be returned to the application 435 (step 490). The application 435 may store the token (step 492).

OTP Generation

In an embodiment of the current technique, the OTP generation function may be expressed as with a set of inputs. In some embodiments the inputs may include a device ID which may be a unique hardware ID. When a device generates an OTP, it may include a monotonic value, key, key identifier, and device ID as inputs. In at least one embodiment, the use of the device ID creates a different OTP than if the device ID were not used. This adds a layer of complexity to the algorithm as an attacker with the other input values may not be able to re-create OTPs as the attacker does not have the device ID and may not know that it is to be used in the OTP generation. Or the attacker may not have source code for the algorithm implementation that would permit varying the device ID value.

OTP Validation

In at least some embodiments, an OTP generator may generate an OTP with the device ID as an input. The OTP generator may then send the OTP for validation to an authentication entity. The authentication entity may generate a similar OTP also using the device ID as an input. The authentication entity may decide whether or not to authenticate based on a comparison of the supplied OTP with the internally generated OTP.

Figure 5:
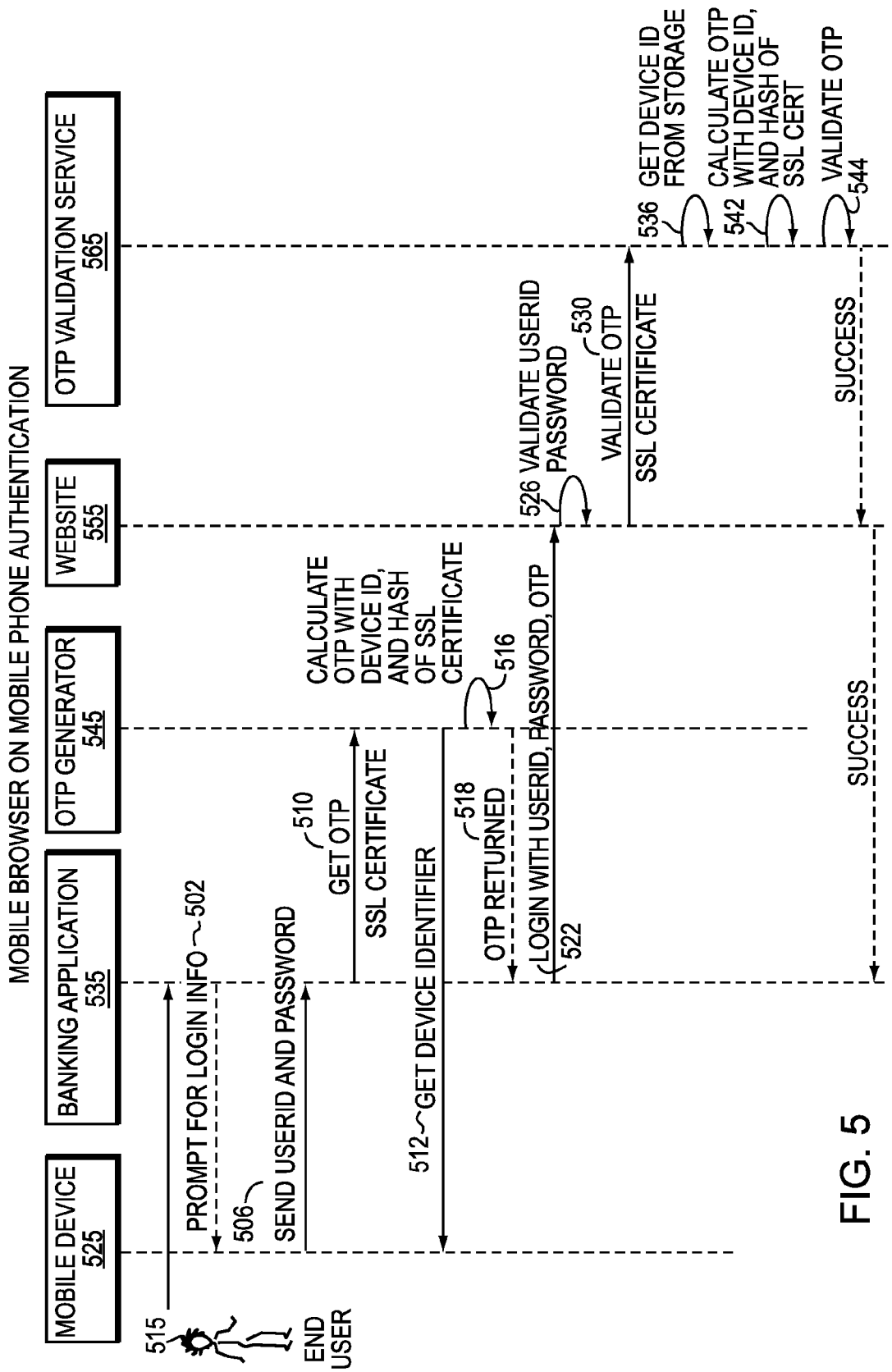
FIG. 5 is an embodiment of the current techniques illustrating mobile application authentication on a mobile phone mobile.

Refer now to the embodiment of FIG. 5 which illustrates an example of authentication using a OTP generator which has been hardware bound based on a device ID. In this embodiment, a user 515 may be using a mobile device 525 to access banking information via a banking application 535. The banking application may prompt the mobile device 525, and hence the user 515, for login information (step 502). The user 515 may enter and the mobile device 525 may send the user ID and password to the banking application 535 (step 506). The banking application 535 may get an OTP from an OTP Generator Component 545 (step 510). The OTP Generator Component 545 may also get the Device ID (step 512). The banking application provides the SSL certificate used in communicating with the website 555 to the OTP Generator Component 545. The OTP Generator Component 545 may calculate a one time passcode (OTP) with device ID and the hash of the SSL certificate (step 516). The OTP Generator Component 545 may return the OTP to the banking application 535 (step 518). The banking application 535 may login to a website 555 with the username, password and OTP (step 522). The website 555 may validate the user ID and password (step 526). The website 555 may communicate with an OTP Validation Service 565 to validate the OTP (step 530). The OTP Validation Service 565 may get the device ID from storage (step 536). The website 555 communicates the SSL certificate in use to the Validation Service 565 during the request to validate OTP 530. The OTP Validation Service 565 may calculate the OTP with the device ID and a hash of the SSL certificate (step 542). The OTP Validation Service 565 may determine whether to validate the OTP (step 544).

In a further embodiment, consider a case where the user has lost their hardware token. In this embodiment, the user may be given software to run on the user's phone. The software may accept an OTP or a temporary password and the device ID may only be known to the OTP generator software and the validation service. In this embodiment, the person in possession the device can generate the final OTP for use to log in. The end user may enter the password or OTP provided by the admin to the OTP generator software, and the software may produce a new OTP bound to the device. This new OTP may be the one used at the validation service. This embodiment may enable emergency access. In alternative embodiments, the set of inputs may include a password.

Consider further embodiments where a device communicates with a remote device, such as a cell tower. In one embodiment, a mobile device could use a cell tower as a source of an identifier. In this embodiment, the OTP algorithm may use the cell tower id as one of the set of inputs for the authentication. In this manner, the ability to generate valid OTPs may be limited to a geographic area. This may be because once the device communicates with a different cell tower, it may use the device ID of the second cell tower, which may be different than the device ID of the first cell tower.

One or more tokens, OTP validators, and authenticators may be included in, or include, by way of example and without limitation, a computer, a mobile telephone, a personal digital assistant (PDA), a smart card, an authentication token, a server, and/or various portions or combinations of these and other processing devices. One or more of tokens and authenticators may thus be implemented as otherwise conventional processing devices programmed by software and/or firmware to perform portions of the technique as described herein. Conventional aspects of such equipment are well known to those skilled in the art, and are therefore not described in detail herein.

In an example implementation, the token comprises or is otherwise associated with an authentication token, such as an RSA SecurID® authentication token. However, the technique is adaptable in a straightforward manner to a wide variety of other cryptographic processing devices.

A token may communicate with an authenticator directly over respective links, or may communicate via one or more intermediary processing devices. For example, if the token comprises an authentication token, it may communicate with authenticator over an internet link or may using an intermediary device such a desktop or portable personal computer, mobile telephone or PDA to allow user entry of the passcode. A token may be viewed as comprising, for example, a combination of an authentication token and an associated computer or other intermediary device physical or virtual. As indicated above, the term "processing device" as used herein is intended to encompass such combinations of devices.

Details regarding certain conventional cryptographic techniques suitable for use in conjunction with the present invention may be found in, e.g., A. J. Menezes et al., Handbook of Applied Cryptography, CRC Press, 1997, which is incorporated by reference herein.

It should again be emphasized that the technique implementations described above are provided by way of illustration, and should not be construed as limiting the present invention to any specific embodiment or group of embodiments. For example, the invention can be implemented in other types of systems, using different arrangements of processing devices and processing operations. Also, message formats and communication protocols utilized may be varied in alternative embodiments. Moreover, various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

Figure 6:
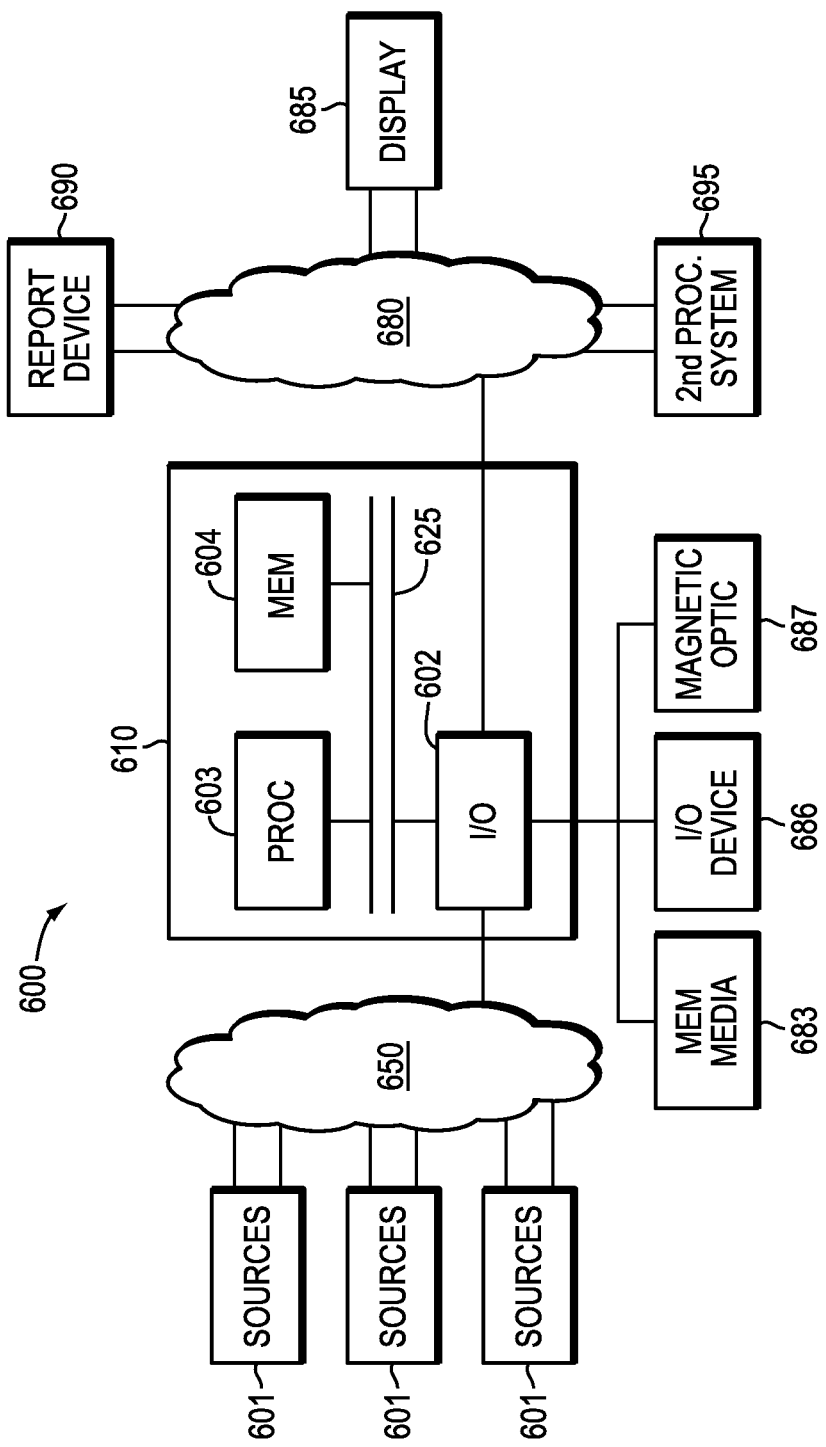
FIG. 6 shows an embodiment of the current invention as loaded on a computer.
Figure 7:
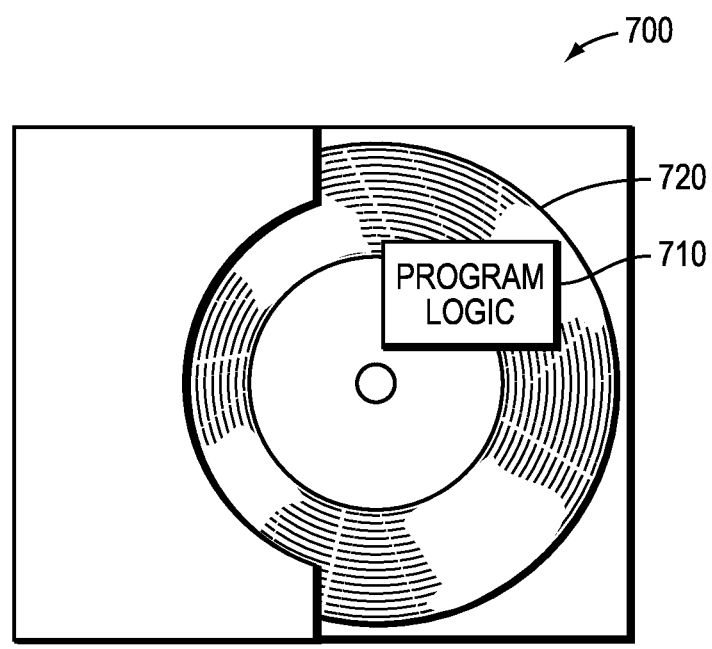
FIG. 7 shows an embodiment of a method of the current invention embodied as program code or a program product.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as the computer of FIG. 6, the machine becomes an apparatus for practicing the invention. When implemented on one or more general-purpose processors, the program code combines with such a processor to provide a unique apparatus that operates analogously to specific logic circuits. As such a general purpose digital machine can be transformed into a special purpose digital machine. FIG. 7 shows Program Logic 710 embodied on a computer-readable medium 730 as shown, and wherein the Logic is encoded in computer-executable code configured for carrying out the reservation service process of this invention and thereby forming a Computer Program Product 700.

The logic for carrying out the method may be embodied as part of the aforementioned system, which is useful for carrying out a method described with reference to embodiments shown in, for example, FIG. 1 and FIG. 2. For purposes of illustrating the present invention, the invention is described as embodied in a specific configuration and using special logical arrangements, but one skilled in the art will appreciate that the device is not limited to the specific configuration but rather only by the claims included with this specification.

What is claimed is:

1. A method for use in generating one time passcodes (OTPs) in a security environment, the security environment comprising an OTP generator and an OTP validator, the method comprising:
    generating, at the OTP generator, an OTP according to a function, wherein the function includes as an input a device id;
    validating the OTP at the OTP validator, whereby the validation comprises:
    generating, at the OTP validator, a second OTP according to the function; and determining whether the OTP is valid based on a comparison of the OTP with the second OTP generated at the OTP validator; wherein the device identifier is obtained from a virtual software environment; wherein the OTP generator operates in the virtual software environment; and wherein the virtual software environment provides the device identifier, wherein the device identifier binds a token to the virtual software environment.

2. A method as in claim 1 wherein the function includes as an input a session identifier.

3. A method as in claim 1 wherein the device identifier is obtained from a network component resident in the security environment of the OTP validator and the OTP generator.

4. A method as in claim 1 wherein the device identifier is obtained from a virtual software environment, wherein the OTP generator operates in the virtual software environment, and wherein the virtual software environment interacts with a physical device on which the virtual software environment is resident to obtain a device identifier.

5. A method as in claim 1, wherein the function further includes as an input a password.

6. The method of claim 1, wherein the device is a virtual device operating in a virtual environment for the OTP Generator.

7. A system for use in generating one time passcodes (OTPs) in security environment, the system comprising:
an OTP generator;
and an OTP validator, and
computer executable code, the computer executable code configured to be executed on one or more processors to enable a computer to perform:
generating, at the OTP generator, an OTP according to a function, wherein the function includes as an input a device id;
validating the OTP at the OTP validator, whereby the validation comprises:
generating, at the OTP validator, a second OTP according to the function; and determining whether the OTP is valid based on a comparison of the OTP with the second OTP generated at the OTP validator; wherein the device identifier is obtained from a virtual software environment; wherein the OTP generator operates in the virtual software environment; and wherein the virtual software environment provides the device identifier, wherein the device identifier binds a token to the virtual software environment.

8. A system as in claim 7 wherein the function includes as input a session identifier.

9. A system as in claim 7 wherein the device identifier is obtained from a network component resident in the security environment of the OTP validator and the OTP generator.

10. A system as in claim 7 wherein the device identifier is obtained from a virtual software environment, wherein the OTP generator operates in the virtual software environment, and wherein the virtual software environment interacts with a physical device on which the virtual software environment is resident to obtain a device identifier.

11. A system as in claim 7, wherein the function further includes as an input a password.

12. A program product stored on a tangible non-transitory computer readable medium for use in generating one time passcodes (OTPs) in security environment, the security environment comprising an OTP generator and an OTP validator, the program product containing computer executable code configured to enable a processor to execute the steps of:
generating, at the OTP generator, an OTP according to a function, wherein the function includes as an input a device id;
validating the OTP at the OTP validator, whereby the validation comprises:
generating, at the OTP validator, a second OTP according to the function; and determining whether the OTP is valid based on a comparison of the OTP with the second OTP generated at the OTP validator; wherein the device identifier is obtained from a virtual software environment; wherein the OTP generator operates in the virtual software environment; and wherein the virtual software environment provides the device identifier, wherein the device identifier binds a token to the virtual software environment.

13. A program product as in claim 12 wherein the function includes as an input a session identifier.

14. A program product as in claim 12 wherein device identifier is obtained from a network component resident in the security environment of the OTP validator and the OTP generator.

15. A program product as in claim 12 wherein the device identifier is obtained from a virtual software environment, wherein the OTP generator operates in the virtual software environment, and wherein the virtual software environment interacts with a physical device on which the virtual software environment is resident to obtain a device identifier.

16. A program product as in claim 12, wherein the function further includes as an input a password.

* * * * *